(12) United States Patent
Dong et al.

(10) Patent No.: US 9,419,811 B2
(45) Date of Patent: Aug. 16, 2016

(54) AUTOMATIC FABRIC MULTICAST GROUP SELECTION IN A DYNAMIC FABRIC AUTOMATION NETWORK ARCHITECTURE

(71) Applicant: CISCO TECHNOLOGY, INC., San Jose, CA (US)

(72) Inventors: Liqin Dong, San Jose, CA (US); Yibin Yang, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 183 days.

(21) Appl. No.: 14/255,860

(22) Filed: Apr. 17, 2014

(65) Prior Publication Data

US 2015/0304117 A1    Oct. 22, 2015

(51) Int. Cl.
| | |
|---|---|
| H04L 12/18 | (2006.01) |
| H04L 29/12 | (2006.01) |
| H04W 4/08 | (2009.01) |
| H04L 12/46 | (2006.01) |
| H04L 12/761 | (2013.01) |
| H04L 12/721 | (2013.01) |

(52) U.S. Cl.
CPC ............ *H04L 12/185* (2013.01); *H04L 12/189* (2013.01); *H04L 12/4641* (2013.01); *H04L 29/12292* (2013.01); *H04L 45/16* (2013.01); *H04W 4/08* (2013.01); *H04L 12/184* (2013.01); *H04L 45/38* (2013.01); *H04L 61/2038* (2013.01); *H04L 61/2069* (2013.01)

(58) Field of Classification Search
CPC ... H04L 12/185; H04L 12/184; H04L 12/189; H04L 12/4641; H04L 45/16; H04L 45/38; H04L 61/2038; H04L 61/2069; H04W 4/08
See application file for complete search history.

(56) References Cited

U.S. PATENT DOCUMENTS

| | | |
|---|---|---|
| 2012/0294309 A1 | 11/2012 | Cai et al. |
| 2013/0111095 A1 | 5/2013 | Mehrotra et al. |
| 2013/0136123 A1* | 5/2013 | Ge .................. H04L 12/4645 370/390 |
| 2013/0151646 A1 | 6/2013 | Chidambaram et al. |
| 2013/0242995 A1 | 9/2013 | Onoue |
| 2013/0329605 A1 | 12/2013 | Nakil et al. |
| 2013/0332602 A1 | 12/2013 | Nakil et al. |

(Continued)

OTHER PUBLICATIONS

PCT 2015-8-17 International Search Report and Written Opinion of the International Searching Authority from International Application Serial No. PCT/US2015/032962.

(Continued)

*Primary Examiner* — Kwang B Yao
*Assistant Examiner* — Moo Ryong Jeong
(74) *Attorney, Agent, or Firm* — Patent Capital Group (57) ABSTRACT

A method is provided in one example embodiment and includes establishing a pool of multicast group addresses reserved for assignment to Layer 2 ("L2") and Layer 3 ("L3") segment IDs of a network comprising an Internet protocol ("IP") fabric, and assigning a first multicast group address from the pool to an L3 segment ID of a Virtual Routing and Forwarding element ("VRF") associated with a new partition established in the network. The method further includes pushing the first multicast group address assignment to a database to provide arguments for configuration profiles, and configuring a new tenant detected on a leaf node of the network using the configuration profiles, in which the configuring comprises specifying multicast group to segment ID assignments for the tenant as specified in the configuration profiles.

14 Claims, 7 Drawing Sheets

(56) References Cited

U.S. PATENT DOCUMENTS

| | | | | |
|---|---|---|---|---|
| 2014/0119191 A1* | 5/2014 | Onoue | ................... | H04L 47/15 370/236 |
| 2014/0201733 A1* | 7/2014 | Benny | ................... | G06F 9/455 718/1 |
| 2015/0026346 A1* | 1/2015 | Yoon | ................... | H04L 47/822 709/226 |
| 2015/0103692 A1 | 4/2015 | Jain et al. | | |

OTHER PUBLICATIONS

Li, X., et al., "Scaling IP Multicast on datacenter topologies," Proceedings of the Ninth ACM Conference on Emerging Networking Experiments and Technologies, CONEXT '13, Santa Barbara, CA, Dec. 11, 2013; 12 pages.

Mahalingam, M., et al., "VXLAN: A Framework for Overlaying Virtualized Layer 2 Networks over Layer 3 Networks," IETF Task Force Internet Draft, draft-mahalingam-dutt-dcops-vxlan-09.txt, Apr. 10, 2014; 23 pages.

Nakagawa, Y., et al., "A Management Method of IP Multicast in Overlay Networks," ACM, New York, NY, Aug. 13, 2012; 6 pages.

Warichet, P., "Top Things to Know about DFA Before Cisco Live Milan," Cisco Blog> Architect and DE Discussions, Jan. 24, 2014 http://blogs.cisco.com/getyourbuildon/top-things-to-know-about-dfw-before-cisco-live-milan.

* cited by examiner

AUTOMATIC FABRIC MULTICAST GROUP SELECTION IN A DYNAMIC FABRIC AUTOMATION NETWORK ARCHITECTURE

TECHNICAL FIELD

This disclosure relates in general to the field of computer networking and, more particularly, to techniques for automatic fabric multicast group selection in a Dynamic Fabric Automation ("DFA") network architecture.

BACKGROUND

Dynamic Fabric Automation ("DFA"), also referred to as "Vinci," is an architecture for facilitating data center networking. The physical topology of DFA is based on a two-tier fat tree, also known as a Clos network, in which a plurality of leaf nodes (which may be implemented as Top of Rack ("ToR") switches or routers) connects to each of a plurality of spine nodes (implemented as switches or routers) and vice versa. To support data forwarding, IP fabric is used in one embodiment of DFA. Additional details are provided in "VXLAN: A Framework for Overlaying Virtualized Layer 2 Networks over Layer 3 Networks" (draft-mahalingam-dutt-dcops-vxlan-02), which is hereby incorporated by reference in its entirety.

Virtual eXtensible Local Area Network ("VXLAN") is a technique for providing an L2 overlay on an L3 network. VXLAN encapsulates native data frames with a VXLAN header and uses UDP/IP for transportation. The VXLAN header contains a VXLAN segment ID/VXLAN network identifier, which is a 24-bit field that identifies virtual network segments for different tenants. Multi-destination frames in VXLAN are carried in IP multicast data packets, which use group addresses as destination IP addresses. A group address can be dedicated to one segment or shared among multiple segments. Additional details are provided in "VXLAN: A Framework for Overlaying Virtualized Layer 2 Networks over Layer 3 Networks" (draft-mahalingam-dutt-dcops-vxlan-02), which is hereby incorporated by reference in its entirety. One of the major advantages of VXLAN is that core routers comprising the underlay network can be implemented using generic IP routers that have no knowledge of the overlay encapsulation. In DFA IP fabric, spine routers may be VXLAN-unaware and are therefore presumed not to perform pruning on VXLAN segment ID.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a pool of multicast group addresses reserved for assignment to Layer 2 ("L2") and Layer 3 ("L3") segment IDs of a network comprising an Internet protocol ("IP") fabric, and assigning a first multicast group address from the pool to an L3 segment ID of a Virtual Routing and Forwarding element ("VRF") associated with a new partition established in the network. The method further includes pushing the first multicast group address assignment to a database to provide arguments for configuration profiles, and configuring a new tenant detected on a leaf node of the network using the configuration profiles, in which the configuring comprises specifying multicast group to segment ID assignments for the tenant as specified in the configuration profiles. The method may further include assigning a second multicast group addresses from the pool to an L2 segment ID of a new network established in the network, and pushing the second multicast group address assignment to the database to provide additional arguments for the configuration profiles. In some embodiments, the configuration profiles include VRF profiles and Virtual eXtensible Local Area Network ("VXLAN") logical interface profiles. In other embodiments, the configuring the new tenant involves generating VRF configuration and Virtual eXtensible Local Area Network ("VXLAN") logical interface configuration for the new tenant.

In still other embodiments, the method may further include dividing the pool into a common pool and a mobility domain pool, and, for each multicast group address in the mobility domain pool, assigning one of the mobility domain multicast group addresses to at least one non-overlapping mobility domain of a group of mobility domains comprising the network if there are fewer mobility domain multicast group addresses than mobility domains; otherwise, assigning to each of the mobility domains at least one non-overlapping multicast group address from the mobility domain pool. Additional embodiments may include, for each new partition, if the partition contains networks of the same mobility domain, assigning one of the multicast group addresses from the mobility domain pool assigned to the mobility domain to an L3 segment ID configured to the partition; otherwise, selecting a multicast group address from the common pool to be assigned to the L3 segment ID configured to the partition. Still other embodiments may include, for each new network, selecting one of the multicast group addresses from the mobility domain pool assigned to the mobility domain of the network for assignment to the L2 segment ID configured to the new network. The partition may be a Data Center Network Manager ("DCNM") partition and the network may be a DCNM network.

Example Embodiments

Multitenancy is an important feature for Vinci IP fabric. Tenant traffic is either switched or routed over the IP fabric, encapsulated with VXLAN segment IDs. A tenant may be allocated one or more VLANs on a leaf node to which the virtual machines (VMs) thereof are connected. Each VLAN is associated with a layer 2 ("L2") segment ID, which is used to encapsulate traffic switched over the fabric. In addition, a tenant may be associated with a VRF on the leaf node. The IP packets of a tenant may be forwarded over the IP fabric based on lookups in its VRF. Each VRF is associated with a layer 3 ("L3") segment ID, which is used to encapsulate traffic routed over the fabric. Each segment, layer two or layer three, will be assigned a multicast group for multi-destination traffic within that segment. In view of the fact that the number of segments it typically much larger than the number of groups supported in the fabric, multiple segments may share a multicast group.

Simplified fabric management and automatic provisioning are important advantages of Vinci. In one embodiment, a network manager element, such as Cisco Systems' Data Center Network Management ("DCNM"), offers a central point of management for ease of operation. A three-level hierarchy may be used in DCNM to facilitate automatic provisioning. Such a hierarchy may include one or more DCNM "organizations" at the highest level, DCNM "partitions" at the middle level, and DCNM "networks" at the lowest level. In particular, a Vinci IP fabric may host one or more DCNM organizations. An example of a DCNM organization is a company, such as Cisco Systems, Inc. ("Cisco"). Each DCNM organization may consist of one or more DCNM partitions. Examples of partitions within an organization may include departments such as "Finance," "Engineering," and "IT." The combination of a DCNM organization and a DCNM partition uniquely identifies a VRF. Using the previously presented examples, Cisco Finance may identify a VRF designated VRFA, Cisco Engineering may identify a VRF designated VRFB, and Cisco IT may identify a VRF designated VRFC. Within each DCNM partition, one or more DCNM networks may be present. Continuing with the previous examples, DCNM networks within the DCNM partition Engineering may include "Experimental" and "Research." A DCNM network can be identified by a mobility domain ("MD") and VLAN. A mobility domain defines a scope within which a virtual machine ("VM") may be moved.

In particular, a data packet received at a leaf node from a VM in a tenant network may have a header with a data packet identifier. The leaf node may perform an L2 learn event by reading a media access control ("MAC") address in the header of the received packet to discover that the VM and the associated tenant network have not yet been provisioned. The leaf node may use the received data packet identifier, such as a VLAN tag, along with the mobility domain (based on the ingress/incoming port), to create an identifier that maps to exactly one segment ID. A VLAN identifier alone may be insufficient to map to exactly one segment ID. For example, a given virtual data center (e.g. VMware vCenter) may have up to 4,096 VLANs, but there may be multiple linked vCenters with duplicate VLAN identifiers. This may happen when a tenant network with a given subnet runs out of VLANs, and thus a linked vCenter with a new pool of 4,096 VLANs is created. For example, this will be the case when the same network segment needs to be extended across multiple vCenters since the first vCenter ran out of resources. Thus, to create a unique identifier that corresponds to only one segment ID, another variable in addition to a VLAN identifier is needed. The mobility domain may provide this unique correspondence.

The mobility domain is an identifier defining the domain within which a VM may be moved, or migrated, from one physical server to another physical server. Thus, the mobility domain is an identifier for a set of VLANs. The mobility domain's movement constraints may be imposed by logical clusters/groups of VLANs, such that a VM may not be able to be moved outside of a defined logical grouping of VLANs. For example, although there may be two linked vCenters, and thus duplicate VLAN numbers which may have access to a given segment ID, a given virtual machine may only be moved within one vCenter. Thus, a vCenter identifier, such as a vCenter IP address, may be used as the mobility domain which, along with a VLAN identifier, map uniquely to a given segment ID. The leaf node may provide the data packet identifier such as the VLAN identifier and mobility domain to the DCNM. The DCNM may contain logic to map the data packet identifier and mobility domain to a given segment ID, and thus obtain provisioning information that it returns to the leaf switch. While the foregoing explanation considers a VM manager like VMware vCenter, the same logic and mechanism may apply to other VM managers such as Microsoft Hyper-V's System Center Virtual Machine Manager ("SCVMM"), Openstack Controller, and others.

As modern data centers become increasingly massive and complex, a need has arisen to unify the management plane to enable holistic management of the data center infrastructure. In one embodiment, DCNM streamlines provisioning of the unified fabric and proactively monitors network components, offering a level of visibility and control via a single graphical user interface ("GUI").

DCNM provides VM-aware path management, simplifying the management of the virtual infrastructure by enabling management of the entire path through the physical to the virtual network across the data center environment. DCNM further helps ensure the resiliency of the network infrastructure by monitoring and providing alerts for fabric availability and performance. DCNM's interactive dashboard provides intuitive views into the top fabric users with the capability to view more details of key performance indicators (KPIs). Moreover, because data center management tools must scale to large and distributed data center deployments, DCNM supports deployment of multiple servers will maintaining a consolidated view across distributed data centers.

Figure 1:
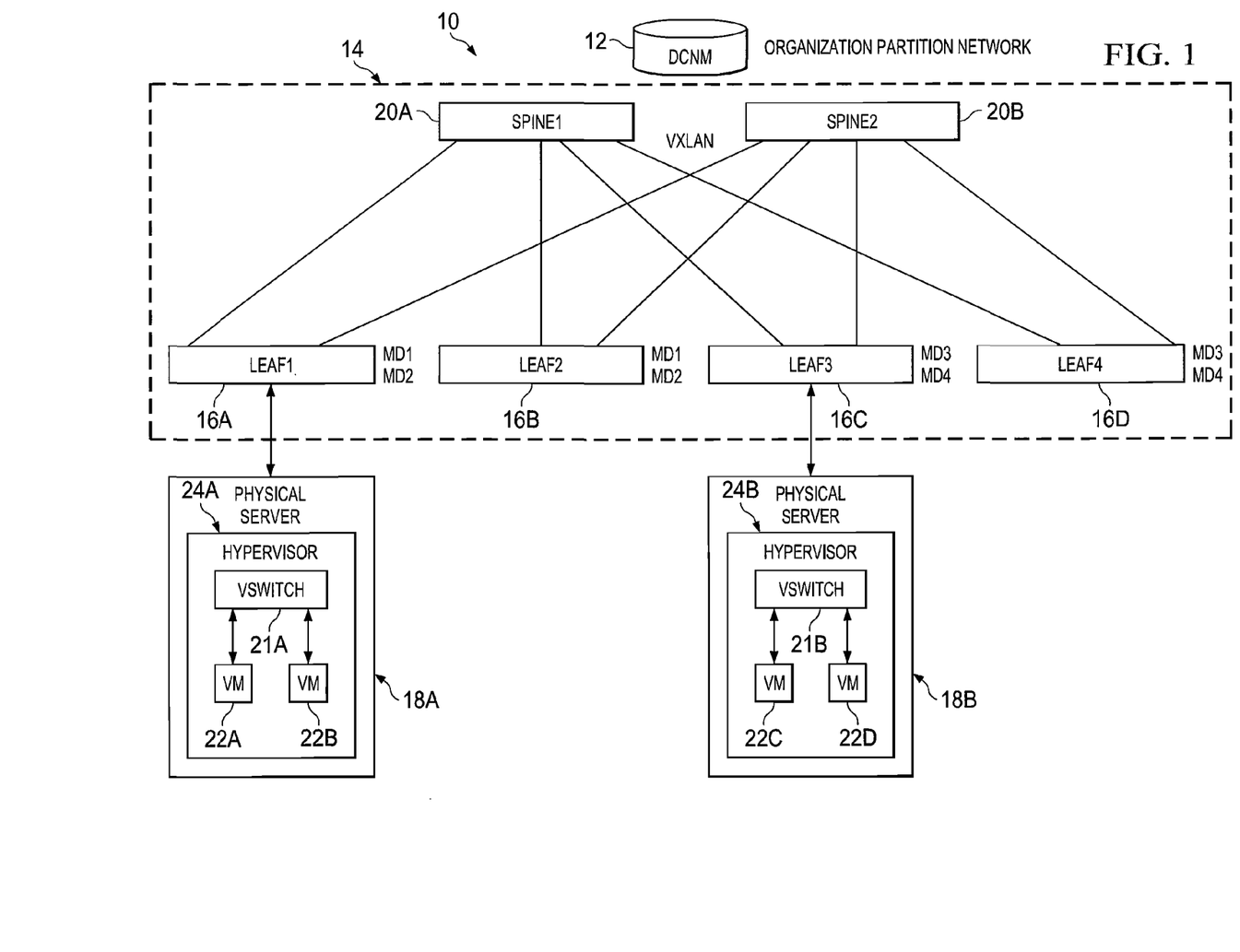
FIG. 1 is a simplified block diagram illustrating an example deployment of a Vinci IP fabric in accordance with features of an embodiment.

Referring to FIG. 1, illustrated therein is a system 10 comprising a DCNM 12 which may be used alone or in concert with one or more other network elements to create, modify, provision and/or delete one or more tenant networks residing in a leaf/spine underlay fabric 14. As shown in FIG. 1, the fabric 14 includes a plurality of leaf nodes 16A-16D, each of which may be implemented as a ToR switch located in a rack unit (not shown) that houses one or more network elements, such as physical servers 18A and 18B. Each leaf node 16A-16D is connected to each of a plurality of spine nodes 20A, 20B, which may be implemented using routers or switches, and is configured to route communications between physical servers 18A, 18B, in the rack unit and other network elements. Each physical server 18A, 18B, may host one or more virtual switches 21A and 21B and VMs 22A-22D. Virtual switches 21A, 21B, and virtual machines 22A-22D may be created and run on each physical server 18A, 18B, on top of a hypervisor 24A, 24B.

Each virtual switch 21A, 21B, may be configured to manage communications of VMs in particular virtual networks and/or subnetworks ("subnets"). Each virtual switch 21A, 21B, may be embodied by software stored and executed on the corresponding physical server 18A, 18B. Thus, the virtual switch 21A, 21B, performs functions of a physical switch device. Similarly, each VM 22A-22D may be software stored and executed on the corresponding physical server 18A, 18B. The VM 22A-22D is configured to exchange communications with other VMs via the fabric 14. It may be appreciated that any number of physical servers hosting any number of virtual switches and VMs may be present in the system 10. For simplicity, FIG. 1 illustrates a single physical server 18A, associated with leaf node 16A and a single physical server 18B, associated with leaf node 16C. Virtual switch 21A, 21B, may, in one example, manage communications of multiple VMs of the physical server.

Though not illustrated in FIG. 1, the physical server 18A, 18B, associated with leaf switch 16A, 16C may be housed in a rack unit or "rack." Other physical servers, similar to the physical server 18A, 18B, may also be housed in the rack. Leaf nodes 16A-16D are responsible for managing communications (e.g., routing and forwarding) originating from and destined for physical servers (and virtual machines and virtual switches hosted by the physical servers) in the rack. Hence the term "top-of-rack" (ToR) ascribed to leaf nodes 16A-16D. Leaf nodes 16A-16D may be used to provide redundancy and fault-tolerance for communications associated with physical servers, virtual machines and virtual switches in the rack. Thus, leaf node 16A is a peer to leaf node 16B, and vice versa. These leaf nodes are configured to communicate with a network controller unit ("network controller"), not shown in FIG. 1, which is configured to manage communications between leaf nodes in different racks.

As stated above, physical server 18A hosts the virtual switch 21A and VMs 22A, 22B. The VM 22A may exchange communications (e.g. data packets) with other VMs in the network via leaf nodes 16A-16D. Each VM is a member of a tenant network, which is a unique L3 subnet that may contain one or more VLANs. For example, a tenant "Company A" may have two tiers/tenant networks; namely 1.1.1.0/24 and 2.2.2.0/24. A tenant network, or subnet, can span multiple VLANs. As the tenant network of which VM is a member, it may be provisioned with certain network attributes in order to exchange data packets. For example, upon instantiation, a tenant network and a VM therein may be provisioned with virtual network segmentation resources, for example the VM and tenant network may be associated with one or more virtual Local Area Network (VLAN) identifiers, and a subnet identifier. In one example, virtual network segmentation resources may be provisioned on a per-switch or per-port basis (e.g., up to four thousand VLANs per switch or four thousand per port of a switch). Thus, when a tenant network and VM therein are created, a ToR switch may select an unused VLAN for a given segmentation assignment. The virtual segmentation resources may also include a Switch Virtual Interface (SVI) assignment, an Access Control List (ACL) assignment, a Quality of Service (QoS) assignment, a Virtual Routing and Forwarding (VRF) assignment, etc. It may be appreciated that other network information now known or heretofore contemplated may also be assigned to the VM. Each tenant network is also associated with a segment identifier (segment ID), which is used to uniquely identify the tenant network in the leaf/spine fabric 14. A segment ID is a 24-bit identifier that allows 16 million unique tenant networks to be addressed. VXLAN is a specific MAC over IP/UDP encapsulation scheme that also has a VNI (virtual network identifier) which also happens to be 24-bits. However, the term "segment" as used herein is more generic than a VNI in that it is an identifier, but it does not dictate that the encapsulation should be VXLAN or any other encapsulation scheme.

Additionally, upon instantiation, the VM 22A may be provisioned with identifier information that may include an Internet Protocol (IP) address, a Media Access Control (MAC) address, a port number associated with the VLAN to which it is assigned, etc. Once the VM 22A is instantiated with resources, which may also include assigning one or more network identifiers such as a subnet or VLAN to the VM's virtual network interface card (vNIC), the VM 22A becomes capable of exchanging communications with other VMs (that have also been properly instantiated) in the network.

In order to provision a tenant network and a VM therein at the associated leaf node on the underlay network, configuration messages using a control protocol may be exchanged between a virtual switch that manages the VM and the associated leaf node to which the physical device hosting the virtual switch and VM are connected. An example control protocol for sending configuration messages is a Virtual Station Interface (VSI) Discovery Protocol (VDP) "digital handshake" message as defined by the Institute of Electrical and Electronic Engineers (IEEE) 802.1Qbg standard. VDP is a reliable protocol that enables configuration messages to be exchanged between a VSI and a ToR switch in order to provision a VM managed by the virtual switch with network resources (including virtual network segmentation resources). Specifically, VDP enables provisioning of network resources on physical switch ports associated with the virtual switch, one of which may be associated with the VM. For example, the virtual switch may have multiple physical switch ports associated with it, and the VM may be configured to exchange communications via one of these ports. As VDP messages are exchanged between the virtual switch and the ToR switch, the port that is associated with the VM may be provisioned with the network resources. For the sake of simplicity, FIG. 1 illustrates a VM connected to a single virtual switch, and thus, the VDP message exchanges herein are described in association with this example. However, it should be appreciated that the techniques described herein may enable network resources to be provisioned for multiple VMs, multiple virtual switches and multiple physical servers. It should also be appreciated that VDP is merely used as an example herein and that the techniques described herein are generally applicable to any handshake-based provisioning protocol between a virtual switch and a ToR switch.

Figure 2:
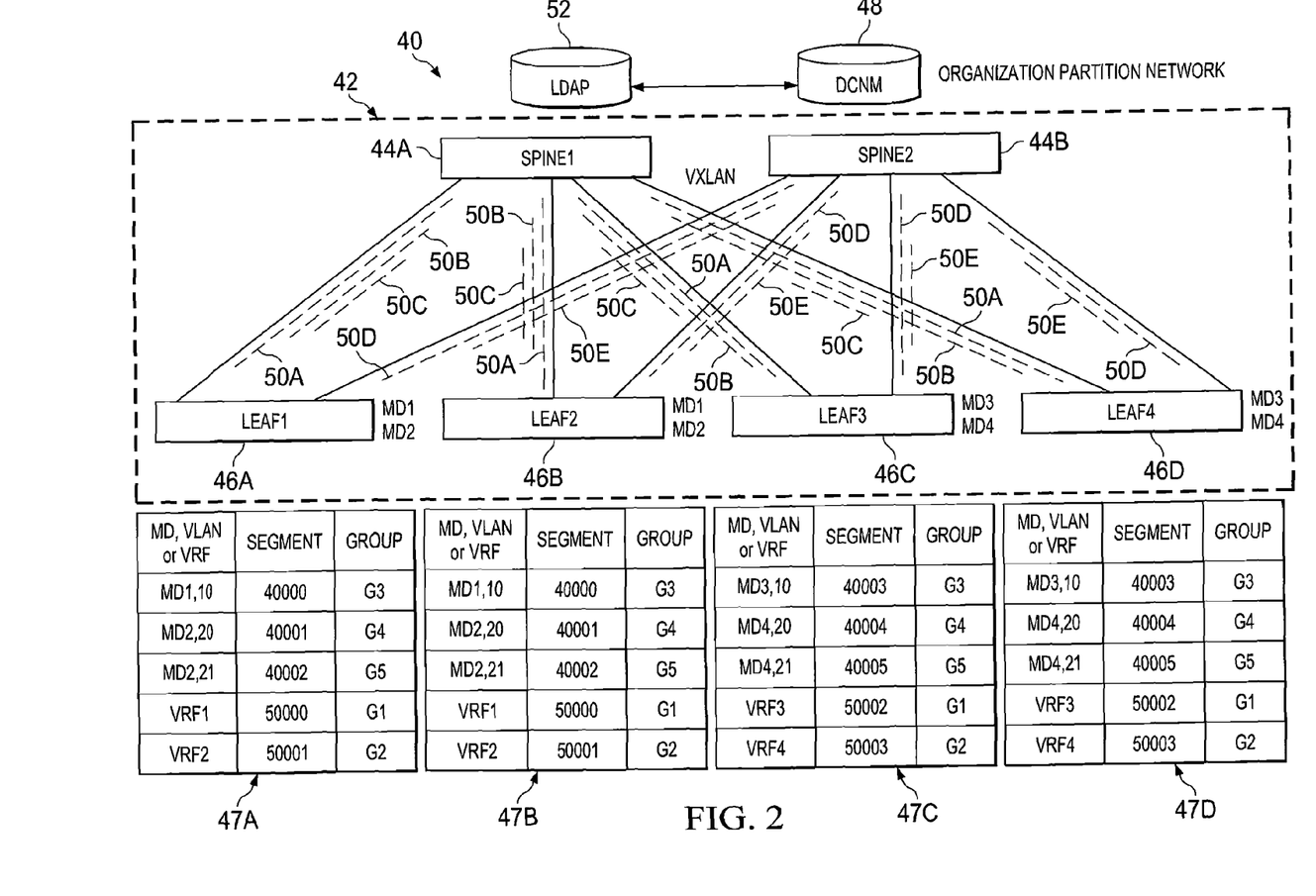
FIG. 2 is a simplified block diagram illustrating another example deployment of a Vinci IP fabric in accordance with features of an embodiment.

Referring now to FIG. 2, depicted therein is a system 40 including an example deployment of a Vinci IP fabric 42 in accordance with features of one embodiment. As shown in FIG. 2, the fabric 42 includes two spine routers, respectively designated by reference numerals 44A and 44B, and four leaf nodes, respectively designated by reference numerals 46A-46D. In one embodiment, both spine nodes 44A, 44B, and leaf nodes 46A-46D are implemented using routers, although switches or other network devices may alternatively or additionally be used. A DCNM 48 is provided in the system 40 and may be used to manage spine nodes 44A-44B, and leaf nodes 46A-46D in the IP fabric 42 as described above. In the illustrated embodiment, four mobility domains, designated MD1, MD2, MD3 and MD4, are configured for VM move. In the embodiment illustrated in FIG. 2, mobility domains MD1 and MD2 are configured on leaf nodes 46A and 46B, while mobility domains MD3 and MD 4 are configured on leaf nodes 46C and 46D. As shown in tables 47A and 47B, on leaf nodes 46A and 46B, two VRFs, designated VRF1 and VRF2, have been created and allocated L3 segment IDs 50000 and 50001, respectively. VRF1 contains a DCNM network identified by mobility domain MD1 and VLAN 10 and allocated L2 segment ID 40000, while VRF2 contains two DCNM networks identified by mobility domain MD2 and VLANs 20-21 and allocated L2 segment IDs 40001 and 40002, respectively.

These three DCNM networks are instantiated on each of leaf nodes 46A and 46B. Similarly, as shown in tables 47C and 47D, on each of leaf nodes 46C and 46D, two other VRFs, respectively designated VRF3 and VRF4, have been created and allocated L3 segment IDs 50002 and 50002, respectively. VRF3 contains a DCNM network identified by mobility domain MD3 and VLAN 10, while VRF4 contains two DCNM networks identified by mobility domain MD4 and VLANs 20-21, respectively. These three DCNM networks are instantiated on each of the leaf nodes 46C and 46D.

In the example shown in FIG. 2, there are five multicast groups, respectively designated G1, G2, G3, G4 and G5. The multicast trees of G1, G2, G3, G4 and G5 are represented by dashed lines 50A-50E, respectively. Each L2 or L3 segment should be assigned to one of the five multicast groups G1-G5. FIG. 2 depicts a possible arrangement of assignments of groups to segments. For example, as shown in FIG. 2, group G1 is assigned to L3 segments 50000 and 50002, group G2 is assigned to L3 segments 50001 and 50003, group G3 is assigned to L2 segments 40000 and 40003, group G4 is assigned to L2 segments 40001 and 40004, and group G5 is assigned to L2 segments 40002 and 40005. It may be recognized that, given a large number of segments in an IP fabric, as well as the dynamic nature of VMs, the assignment of a multicast group to one or more segments should not be performed manually and/or statically.

The multicast group to segment assignments illustrated in FIG. 2 result in unnecessary flooding over the IP fabric 42. For example, since multicast group G1 is shared by segments 50000 and 50002, which are present in leaf nodes 46A-46B and leaf nodes 46C-46D, respectively, the multicast tree 50A of multicast group G1 has to reach all four leaf nodes 46A-46D. Given that spine nodes do not perform pruning on segment ID, unnecessary flooding will occur. For example, segment 50000 multi-destination traffic sourced from leaf node 46A will reach leaf nodes 46C and 46D, where it will be dropped. Similarly, multicast group G3 is shared by segments 40000 and 40003, which are present in leaf nodes 46A-46B and leaf nodes 46C-46D, respectively, the multicast tree 50C of multicast group G3 has to reach all four leaf nodes 46A-46D. As a result of this assignment, segment 40003 multi-destination traffic sourced from leaf node 46C will reach leaf nodes 46A and 46B, where it will be dropped. The same will be true with respect to multicast groups G2, G4, and G5.

Figure 3:
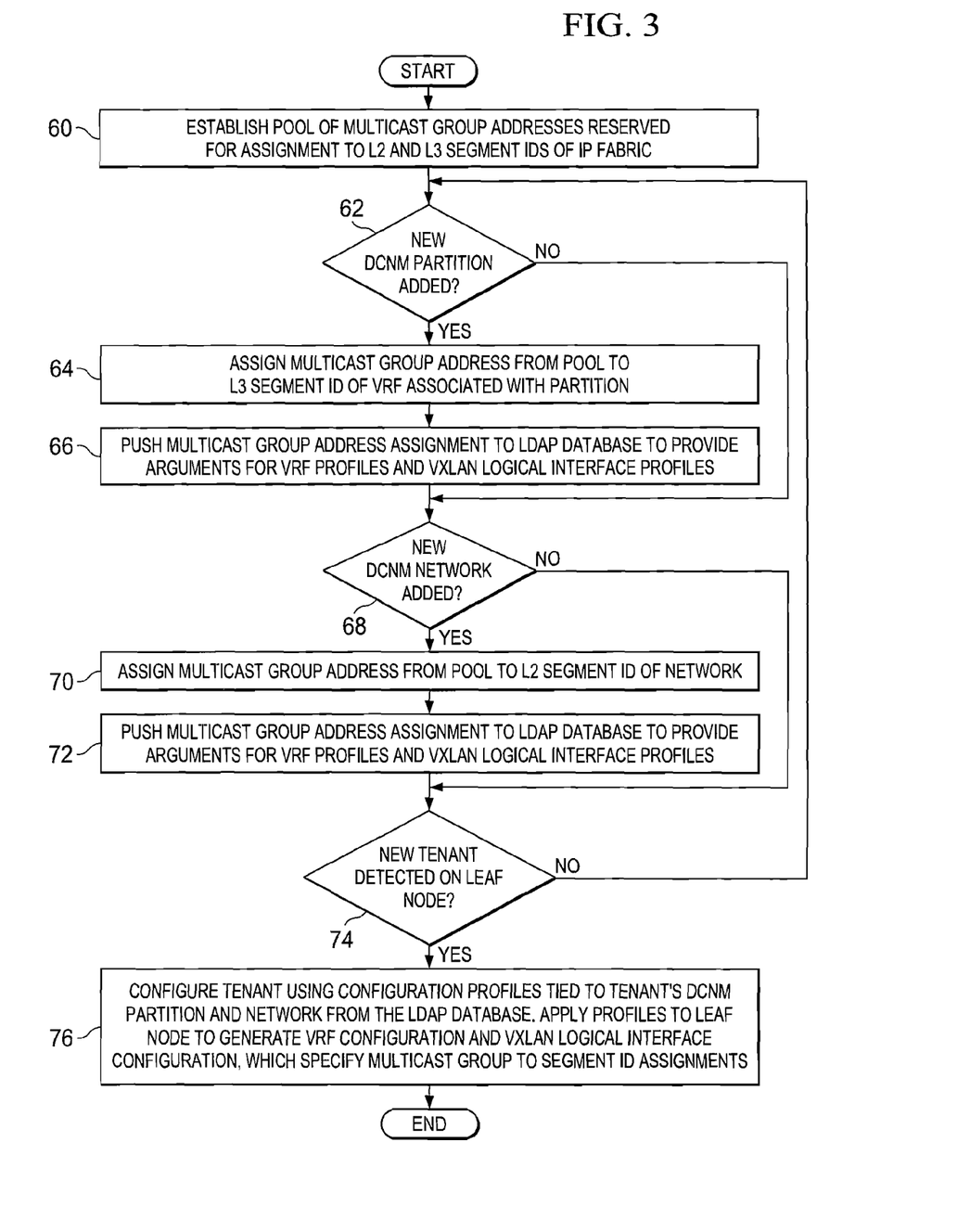
FIG. 3 is a flowchart illustrating operation of a process for performing automatic provisioning of multicast group to segment ID assignment in accordance with embodiments described herein.

In view of the foregoing, it is clear that at least two issues exist to be considered regarding the assignment of multicast group to segment ID. One is the issue of how to automatically provision the assignment so that resources can be reserved and released dynamically. Another is the issue of determining the best group to assign to a segment so as to reduce unnecessary flooding of multi-destination traffic over the IP fabric. In an IP fabric, it is assumed there is a pool of multicast groups, or more specifically, multicast group addresses, that are reserved to be assigned to L2 and L3 segments. The number of group addresses in the pool is limited and a group address in the pool may be shared by multiple segments. For example, as previously noted, in the embodiment illustrated in FIG. 2, the pool consists of five multicast groups G1, G2, G3, G4 and G5. Accordingly, one embodiment is an enhancement to the existing DCNM auto-configuration to support dynamic and automatic provisioning of multicast group to segment mapping. FIG. 3 is a flowchart illustrating a process of automatic provisioning of multicast group to segment ID assignment in accordance with embodiments described herein. Referring to FIG. 3, in step 60, a pool of multicast group addresses reserved for assignment to L2 and L3 segment IDs is established. In one embodiment, as represented in steps 62-64, when a DCNM partition is added to a DCNM organization through a DCNM graphical user interface ("GUI"), a multicast group in the pool is automatically assigned to the L3 segment ID of the VRF associated with the DCNM partition. In step 66, the assignment is pushed by the DCNM GUI to an LDAP database, represented in FIG. 2 by an LDAP database 52, to provide arguments for VRF profiles. Additionally, as represented in steps 68-70, when a DCNM network identified by a mobility domain and a VLAN is added to the DCNM partition through the DCNM GUI, a multicast group in the pool is automatically assigned to the L2 segment ID of the DCNM network. In step 72, the assignments are pushed by the DCNM GUI to the LDAP database to provide arguments for interface profiles of VXLAN logical interfaces. When a new tenant is detected by a leaf node (step 74), in step 76, the auto-configuration will retrieve configuration profiles tied to the tenant's DCNM partition and DCNM network from the LDAP database 52. The profiles are applied to the leaf node to generate VRF configuration and VXLAN logical interface configuration, which specify multicast group to segment ID assignments. The leaf node may send out Protocol Independent Multicast ("PIM") join messages upon instantiations of VRF and VXLAN logical interface, if it has not yet joined the associated multicast group. As a result, the building of the fabric multicast tree for the group is triggered by tenant presence on the leaf node.

The above-described procedure accomplishes automatic provisioning of multicast group to segment ID assignment. However, optimal selection of a group to which to assign a given segment ID must also be considered. One approach to group selection is a round robin approach. Using this approach, group addresses are selected from the pool of group addresses from the first group address sequentially through to the last group address and then the process begins again with the first group address. The assignments depicted in FIG. 2 are achieved in a round robin fashion for a pool of five group addresses G1-G5, assuming the following sequence of adding DCNM partitions and DCNM networks: (1) DCNM partition VRF1 (assigned group G1); (2) DCNM partition VRF2 (assigned group G2); (3) DCNM network (MD1, VLAN 10) (assigned group G3); (4) DCNM network (MD2, VLAN 20) (assigned group G4); (5) DCNM network (MD2, VLAN 21) (assigned group G5); (6) DCNM partition VRF3 (assigned group G1); (7) DCNM partition VRF4 (assigned group G2); (8) DCNM network (MD3, VLAN 10) (assigned group G3); (9) DCNM network (MD4, VLAN 20) (assigned group G4); and (10) DCNM network (MD4, VLAN 21) (assigned group G5). As previously discussed with reference to FIG. 2, the forgoing assignments are undesirable due to unnecessary flooding in the IP fabric.

In accordance with features of one embodiment, mobility domain aware group selection is employed to reduce unnecessary flooding in the IP fabric. Specifically, multicast groups are separated into two categories: mobility domain specific groups and nonspecific groups. A mobility domain is assigned one or more mobility domain specific groups. If traffic in a segment is scoped by a mobility domain, one of the mobility domain specific groups assigned to the mobility domain is selected for the segment. Otherwise, a nonspecific group is selected. In this manner, the multicast tree of a mobility domain specific group can only reach leafs that are configured with mobility domains that are assigned the group. One embodiment of mobility domain aware group selection is as follows.

Figure 4:
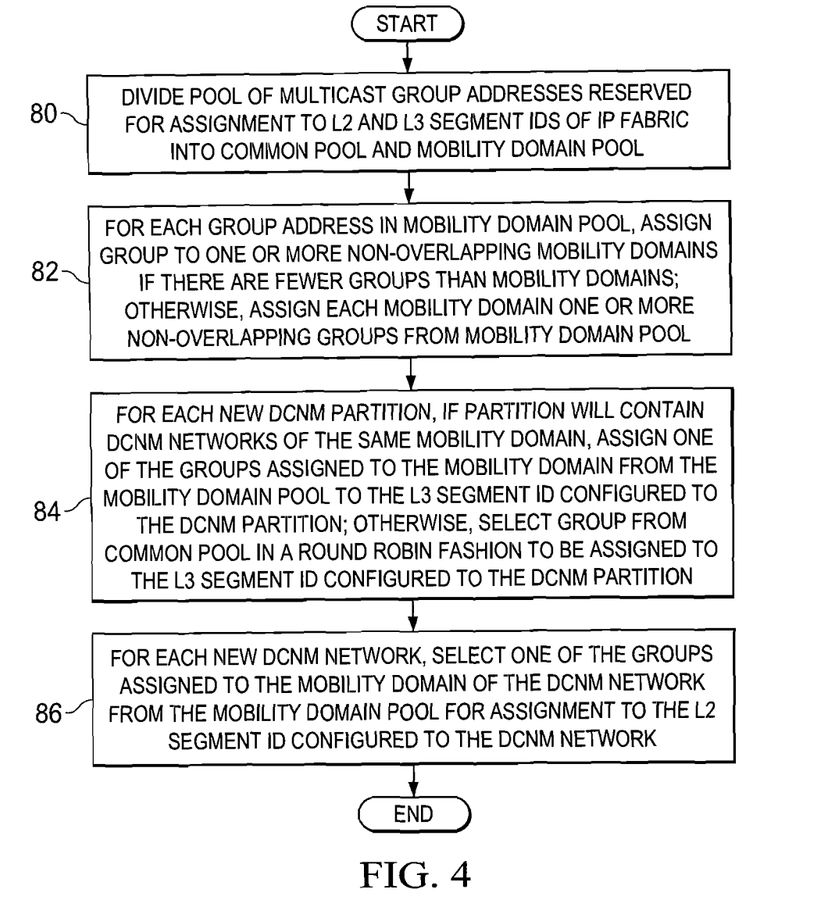
FIG. 4 is a flowchart illustrating operation of a process for performing mobility domain aware multicast group selection and assignment.

A flowchart illustrating an embodiment of a process for performing mobility domain aware group selection is shown in FIG. 4. In step 80, the multicast group addresses that make up the pool for the IP fabric are divided into two sub-pools, including a common pool and a mobility domain pool. In step 82, with respect to the mobility domain pool, if there are fewer groups than mobility domains, each group is assigned to one or more non-overlapping mobility domains; otherwise, each mobility domain is assigned one or more non-overlapping groups from the mobility domain pool. Additionally, a new GUI field is introduced in the DCNM GUI for adding a DCNM partition to a DCNM organization. The new field allows a user to 1) indicate whether or not the DCNM partition will contain DCNM networks of a same mobility domain; and 2) if the DCNM partition will contain DCNM networks of a same mobility domain, specify the mobility domain. In step 84, when adding a DCNM partition, if the user indicates yes (meaning that the DCNM partition will contain DCNM networks of the same mobility domain), one of the groups assigned to the mobility domain from the mobility domain pool will be selected for the L3 segment ID configured to the DCNM partition. Otherwise, a group from the common pool will be selected in a round robin fashion for the L3 segment ID configured to the DCNM partition. In step 86, when a new DCNM network is added to a DCNM partition through the DCNM GUI, one of the groups assigned to its mobility domain from the mobility domain pool will be selected for the L2 segment ID configured to the DCNM network.

Figure 5:
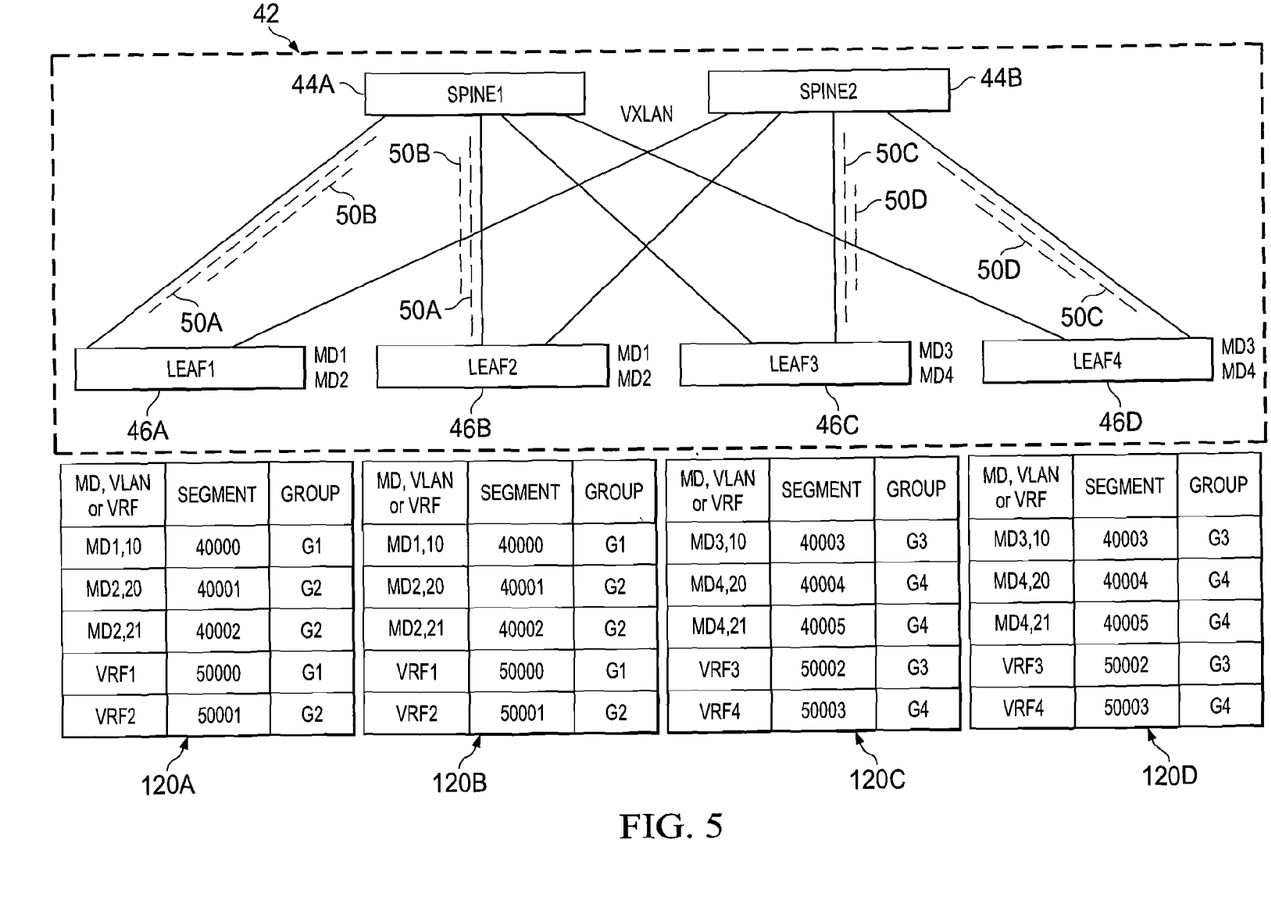
FIG. 5 is a simplified block diagram of illustrating how mobility domain aware multicast group selection may work in accordance with embodiments described herein.

FIG. 5 illustrates how an embodiment of mobility domain aware group selection may work. Group addresses G1, G2, G3, G4 and G5 are divided into a common pool consisting of group address G5 and a mobility domain pool consisting of group addresses G1, G2, G3 and G4. Mobility domains MD1, MD2, MD3 and MD4 are assigned groups G1, G2, G3 and G4 in the mobility domain pool, respectively. When the DCNM partition associated with VRF1 is added, a user indicates that it will contain DCNM networks of mobility domain MD1 only. Therefore, as shown in tables 120A and 120B, the group assigned to mobility domain MD1, G1, is selected for the L3 segment ID configured to the DCNM partition, 50000. The same occurs for each of the other three DCNM partitions associated with VRF2, VRF3, and VRF4, as those partitions are added. When the DCNM network associated with mobility domain MD1 and VLAN 10 is added, the group assigned to mobility domain MD1, G1, is selected for the L2 segment ID configured to the DCNM network, 40000. The same occurs for each of the other five DCNM networks. In particular, when the DCNM network associated with mobility domain MD2 and VLAN 20 is added, the group assigned to mobility domain MD2, G2, is selected for the L2 segment ID configured to the DCNM network, 40001. When the DCNM network associated with mobility domain MD2 and VLAN 21 is added, the group assigned to mobility domain MD2, G2, is selected for the L2 segment ID configured to the DCNM network, 40002. When the DCNM network associated with mobility domain MD3 and VLAN 10 is added, as shown in tables 120C and 120D, the group assigned to mobility domain MD3, G3, is selected for the L2 segment ID configured to the DCNM network, 40003. When the DCNM network associated with mobility domain MD4 and VLAN 20 is added, the group assigned to mobility domain MD4, G4, is selected for the L2 segment ID configured to the DCNM network, 40004. When the DCNM network associated with mobility domain MD4 and VLAN 21 is added, the group assigned to mobility domain MD4, G4, is selected for the L2 segment ID configured to the DCNM network, 40005.

The above group selection process limits the multicast tree of a group in the mobility domain pool to only reach those leaf nodes configured with mobility domains to which the group is assigned. For example, the multicast tree 50A of the group assigned to mobility domain MD1, G1, is limited to only reach leaf nodes 46A and 46B, both of which are configured with mobility domain MD1. Similarly, the multicast tree 50B of the group assigned to mobility domain MD2, G2, is also limited to only reach leaf nodes 46A and 46B, both of which are configured with mobility domain MD2. The multicast trees 50C and 50D of the groups assigned to mobility domains MD3 (G3) and MD4 (G4), respectively, are each limited to only reach leaf nodes 46C and 46D, both of which are configured with mobility domains MD3 and MD4. As a result, unnecessary flooding is reduced for groups in the mobility domain pool.

Figure 6:
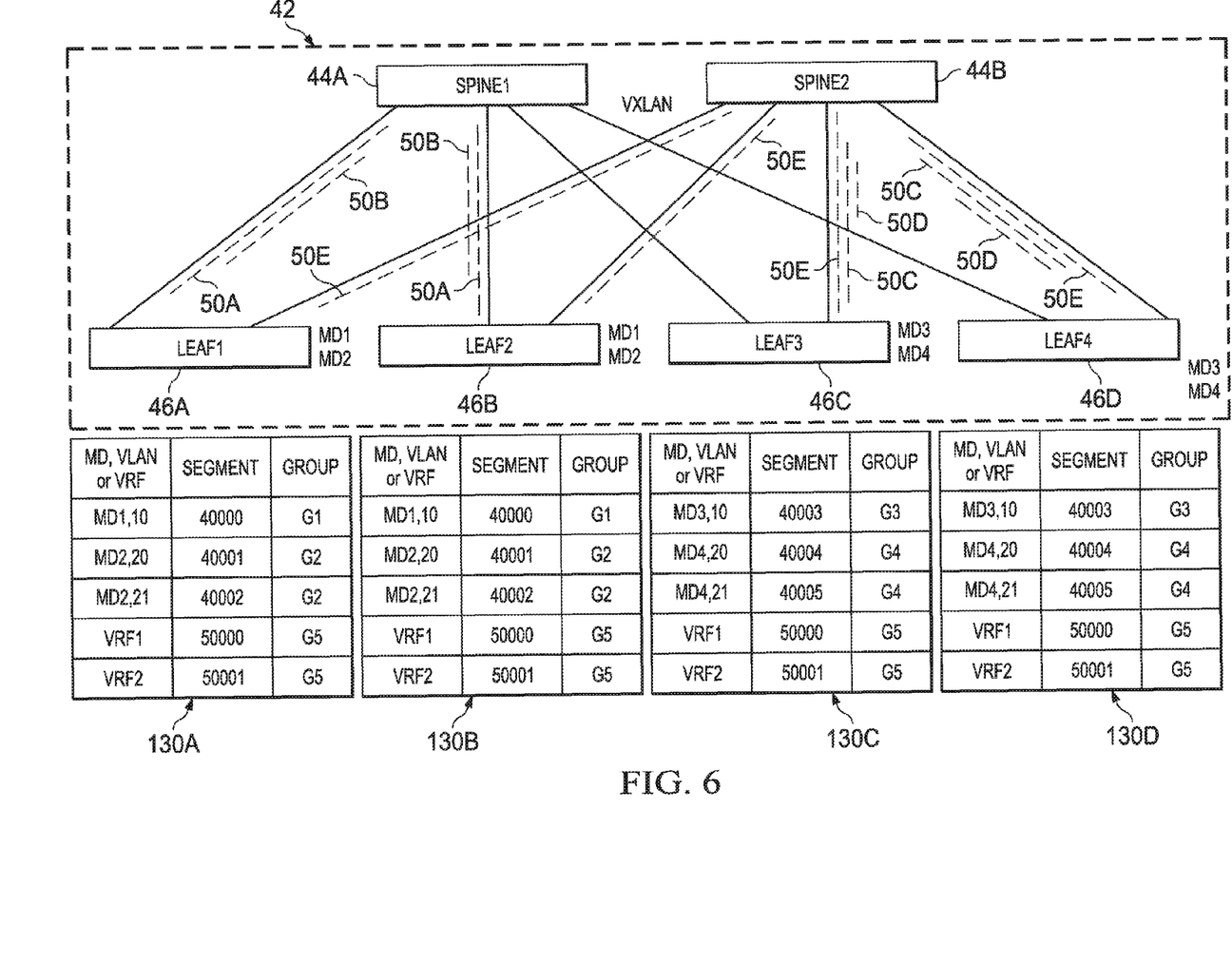
FIG. 6 is a simplified block diagram providing an alternative illustration of how mobility domain aware multicast group selection may work in accordance with embodiments described herein.

Referring now to FIG. 6, illustrated there is another example mobility domain aware group selection. In contrast to FIG. 5, in the example shown in FIG. 6, and specifically as shown in tables 130A-130D, it will be assumed that VRF1 is associated with two DCNM networks identified by (MD1, 10) and (MD3, 10), while VRF2 is associated with four DCNM networks identified by (MD2, 20), (MD2, 21), (MD4, 20) and (MD4, 21). VRF3 and VRF4 are no longer configured. Since both VRF1 and VRF2 span two mobility domains, their segment IDs will be assigned the group in the common pool, G5. In this manner, multicast trees of groups in the mobility domain pool will not be affected by VRF1 and VRF2, which are present on all four leaf nodes.

Figure 7:
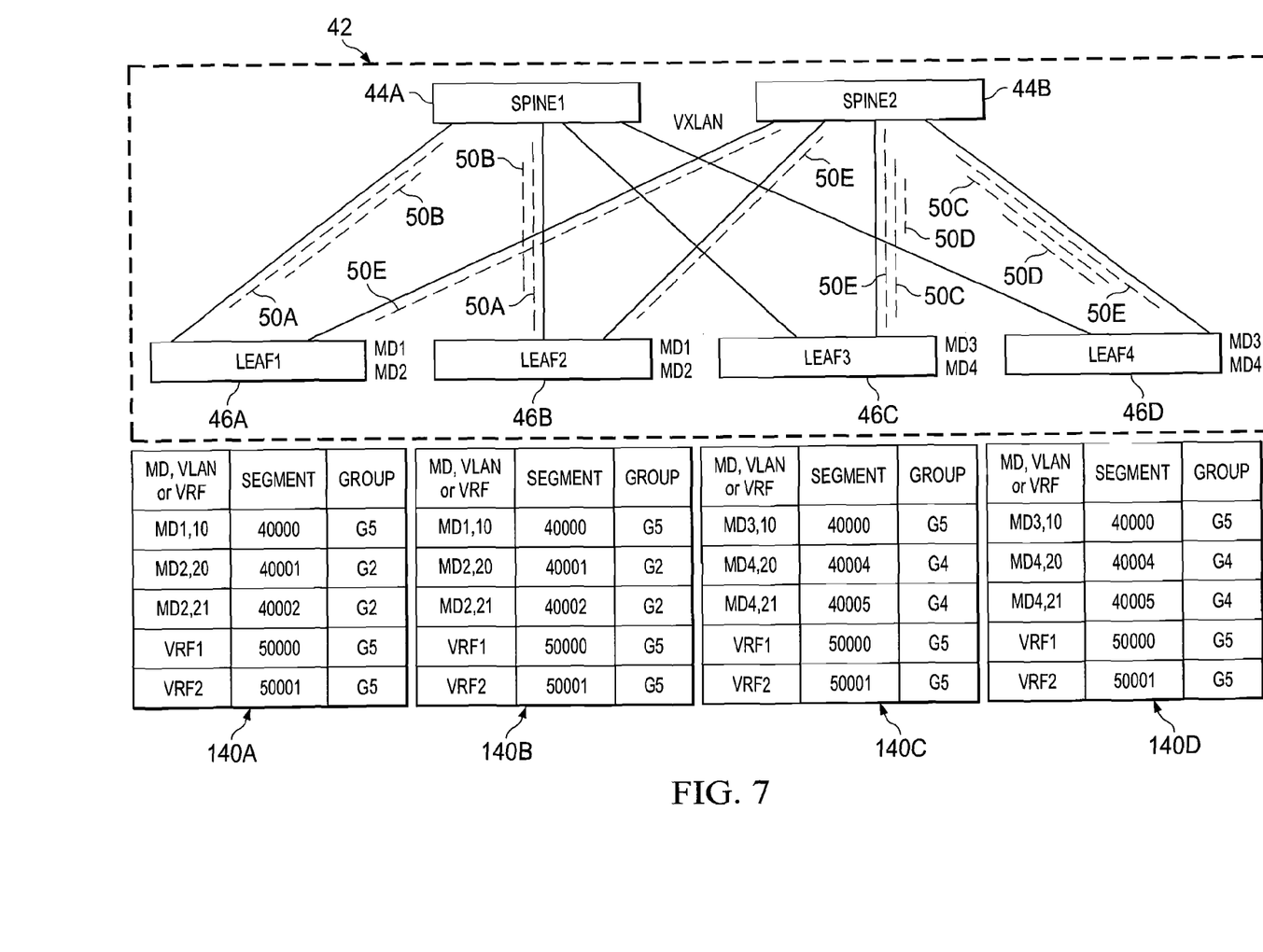
FIG. 7 is a simplified block diagram providing another alternative illustration of how mobility domain aware multicast group selection may work in accordance with embodiments described herein.

A typical case in which each DCNM network has its own unique L2 segment ID has been shown and described. However, in some deployments, users may choose to configure multiple DCNM networks with the same L2 segment ID; that is, multiple DCNM networks may be stitched together by a common L2 segment ID. For example, as shown in FIG. 7, the DCNM network identified by (MD3, 10) is configured with segment ID 40000, and thus stitched to the DCNM network identified by (MD1, 10), which is also configured with segment ID 40000. If the stitched DCNM networks belong to different mobility domains, the group selected for their common L2 segment ID should be from the common pool. Otherwise, it should be from the mobility domain pool. For example, as shown in FIG. 7, and specifically as shown in tables 140A-140D, since DCNM networks (MD1, 10) and (MD3, 10) are stitched, group G5 from the common pool should be selected for their common L2 segment ID 40000 because they belong to two different mobility domains. To handle DCNM network stitching, a new GUI field is introduced in the DCNM GUI that adds a DCNM network to a DCNM partition. This field allows a user to indicate whether the DCNM network being added will be stitched with other DCNM networks of different mobility domains. When adding a DCNM network, if the user indicates that the network will be stitched with other DCNM networks of different mobility domains, a multicast group from the common pool will be selected in a round robin fashion for the L2 segment ID configured to the DCNM network. Otherwise, one of the multicast groups assigned to the mobility domain of the DCNM network will be selected for the L2 segment ID from the mobility domain pool.

Although embodiments have been shown and described using DCNM GUI, they are equally applicable in cases in which the DCNM is controlled by an orchestrator, e.g., OpenStack, through REpresentational State Transfer (REST) APIs. In the orchestration case, REST APIs should be enhanced to add new parameters in a way similar to DCNM GUI enhancements.

In summary, the above-described embodiments provide enhancements to auto-configuration to support dynamic provisioning of multicast group to segment ID assignment, or mapping, Certain embodiments employ mobility-domain aware group selection. As a result, IP fabric multicast trees are built based on tenant presence on leaf nodes and unnecessary flooding in the IP fabric is significantly reduced.

In one example implementation, various devices involved in implementing the embodiments described herein can include software for achieving the described functions. For example, referring to FIG. 2, the DCNM 48 may be implemented using one or more computer devices comprising software embodied in one or more tangible media for facilitating the activities described herein. The computer device for implementing the DCNM 48 may also include a memory device (or memory element) for storing information to be used in achieving the functions as outlined herein. Additionally, the computer device for implementing the DCNM 48 may include a processor that is capable of executing software or an algorithm to perform the functions as discussed in this Specification, including but not limited to the functions illustrated in and described with reference to FIGS. 3 and 4. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 3 and 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 3 and 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

It should also be noted that, although the examples provided above are described in the context of VXLAN, the techniques described herein may be implemented in the context of numerous other types of overlay techniques capable of supporting multiple network tenants, including, but not limited to, Network Virtualization using Generic Routing Encapsulation ("NVGRE"), in which case a 24-bit Tenant Network Identifier ("TNI") would be employed in place of the VNID to uniquely identify tenants in the network as described above.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   establishing a pool of multicast group addresses reserved for assignment to Layer 2 ("L2") and Layer 3 ("L3") segment IDs of a network comprising an Internet protocol ("IP") fabric;
   assigning a first multicast group address from the pool to an L3 segment ID of a Virtual Routing and Forwarding element ("VRF") associated with a new partition established in the network;
   pushing the first multicast group address assignment to a database to provide arguments for configuration profiles;
   configuring a new tenant detected on a leaf node of the network using the configuration profiles, wherein the configuring comprises specifying multicast group to segment ID assignments for the tenant as specified in the configuration profiles;
   dividing the pool into a common pool and a mobility domain pool;
   for each multicast group address in the mobility domain pool, assigning one of the mobility domain multicast group addresses to at least one non-overlapping mobility domain of a group of mobility domains comprising the network if there are fewer mobility domain multicast group addresses than mobility domains; otherwise, assigning to each of the mobility domains at least one non-overlapping multicast group address from the mobility domain pool; and
   for each new partition, if the partition contains networks of the same mobility domain, assigning one of the multicast group addresses from the mobility domain pool assigned to the mobility domain to an L3 segment ID configured to the partition; otherwise, selecting a multicast group address from the common pool to be assigned to the L3 segment ID configured to the partition.

2. The method of claim 1 further comprising:
   assigning a second multicast group addresses from the pool to an L2 segment ID of a new network established in the network; and
   pushing the second multicast group address assignment to the database to provide additional arguments for the configuration profiles.

3. The method of claim 1, wherein the configuration profiles comprise VRF profiles and Virtual eXtensible Local Area Network ("VXLAN") logical interface profiles.

4. The method of claim 1 wherein the configuring the new tenant comprises generating VRF configuration and Virtual eXtensible Local Area Network ("VXLAN") logical interface configuration for the new tenant.

5. The method of claim 1 further comprising:
   for each new network, if it is not stitched with any networks of other mobility domains, selecting one of the multicast group addresses from the mobility domain pool assigned to the mobility domain of the network for assignment to the L2 segment ID configured to the new network; otherwise, selecting one of the multicast group addresses from the common pool for assignment to the L2 segment ID configured to the new network.

6. The method of claim 1, wherein the partition is a Data Center Network Manager ("DCNM") partition.

7. The method of claim 2, wherein the network is a Data Center Network Manager ("DCNM") network.

8. One or more non-transitory tangible media that includes code for execution and when executed by a processor is operable to perform operations comprising:
   establishing a pool of multicast group addresses reserved for assignment to Layer 2 ("L2") and Layer 3 ("L3") segment IDs of a network comprising an Internet protocol ("IP") fabric;
   assigning a first multicast group address from the pool to an L3 segment ID of a Virtual Routing and Forwarding element ("VRF") associated with a new partition established in the network;
   pushing the first multicast group address assignment to a database to provide arguments for configuration profiles;
   configuring a new tenant detected on a leaf node of the network using the configuration profiles, wherein the configuring comprises specifying multicast group to segment ID assignments for the tenant as specified in the configuration profiles;
   dividing the pool into a common pool and a mobility domain pool;
   for each multicast group address in the mobility domain pool, assigning one of the mobility domain multicast group addresses to at least one non-overlapping mobility domain of a group of mobility domains comprising the network if there are fewer mobility domain multicast group addresses than mobility domains; otherwise, assigning to each of the mobility domains at least one non-overlapping multicast group address from the mobility domain pool; and
   for each new partition, if the partition contains networks of the same mobility domain, assigning one of the multicast group addresses from the mobility domain pool assigned to the mobility domain to an L3 segment ID configured to the partition; otherwise, selecting a multicast group address from the common pool to be assigned to the L3 segment ID configured to the partition.

9. The media of claim 8, wherein the operations further comprise:
   assigning a second multicast group addresses from the pool to an L2 segment ID of a new network established in the network; and
   pushing the second multicast group address assignment to the database to provide additional arguments for the configuration profiles.

10. The media of claim 8, wherein the configuration profiles comprise VRF profiles and Virtual eXtensible Local Area Network ("VXLAN") logical interface profiles.

11. The media of claim 8 wherein the configuring the new tenant comprises generating VRF configuration and Virtual eXtensible Local Area Network ("VXLAN") logical interface configuration for the new tenant.

12. The media of claim 8, wherein the operations further comprise:
for each new network, if it is not stitched with any networks of other mobility domains, selecting one of the multicast group addresses from the mobility domain pool assigned to the mobility domain of the network for assignment to the L2 segment ID configured to the new network; otherwise, selecting one of the multicast group addresses from the common pool for assignment to the L2 segment ID configured to the new network.

13. An apparatus comprising:
a memory element configured to store data;
a processor operable to execute instructions associated with the data; and
a network manager element configured to:
establish a pool of multicast group addresses reserved for assignment to Layer 2 ("L2") and Layer 3 ("L3") segment IDs of a network comprising an Internet protocol ("IP") fabric;
assign a first multicast group address from the pool to an L3 segment ID of a Virtual Routing and Forwarding element ("VRF") associated with a new partition established in the network;
pushing the first multicast group address assignment to a database to provide arguments for configuration profiles;
configure a new tenant detected on a leaf node of the network using the configuration profiles, wherein the configuring comprises specifying multicast group to segment ID assignments for the tenant as specified in the configuration profiles;
divide the pool into a common pool and a mobility domain pool;
for each multicast group address in the mobility domain pool, assign one of the mobility domain multicast group addresses to at least one non-overlapping mobility domain of a group of mobility domains comprising the network if there are fewer mobility domain multicast group addresses than mobility domains; otherwise, assigning to each of the mobility domains at least one non-overlapping multicast group address from the mobility domain pool; and
for each new partition, if the partition contains networks of the same mobility domain, assign one of the multicast group addresses from the mobility domain pool assigned to the mobility domain to an L3 segment ID configured to the partition; otherwise, select a multicast group address from the common pool to be assigned to the L3 segment ID configured to the partition.

14. The apparatus of claim 13, wherein the network manager element is further configured to:
for each new network, if it is not stitched with any networks of other mobility domains, select one of the multicast group addresses from the mobility domain pool assigned to the mobility domain of the network for assignment to the L2 segment ID configured to the new network; otherwise, select one of the multicast group addresses from the common pool for assignment to the L2 segment ID configured to the new network.

* * * * *